Figure 1:
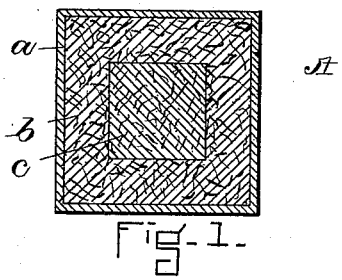

(No Model.) 2 Sheets—Sheet 1.

F. F. RAYMOND, 2d.
CAM OR GEAR AND BLANK THEREFOR.

No. 464,165. Patented Dec. 1, 1891.

WITNESSES
J. M. Dolan
A. F. Macdonald

INVENTOR
F. F. Raymond (No Model.) 2 Sheets—Sheet 2.

F. F. RAYMOND, 2d.
CAM OR GEAR AND BLANK THEREFOR.

No. 464,165. Patented Dec. 1, 1891.

WITNESSES
J. M. Dolan.
A. F. Macdonald.

INVENTOR
F. F. Raymond 2d

UNITED STATES PATENT OFFICE.

FREEBORN F. RAYMOND, 2D, OF NEWTON, MASSACHUSETTS.

CAM OR GEAR AND BLANK THEREFOR.

SPECIFICATION forming part of Letters Patent No. 464,165, dated December 1, 1891.

Application filed February 11, 1889. Serial No. 299,511. (No model.)

*To all whom it may concern:*

Be it known that I, FREEBORN F. RAYMOND, 2d, a citizen of the United States, residing at Newton, in the county of Middlesex and State of Massachusetts, have invented a new and useful Improvement in the Manufacture of Cams or Gears and Blanks Therefor, of which the following is a full, clear, and exact description, reference being had to the accompanying drawings, forming a part of this specification, in explaining its nature.

It is very desirable that gears have their teeth and cams have their parts against which the cam-roll bears made of steel or other equivalent metal possessing greater wearing properties than iron; but it is not desirable that the entire gear or cam be made of this harder longer-wearing metal, because of the expense in the first instance and because of the increased cost of working the same. Therefore it is not desirable that the gear-blanks or cam-blanks be made entirely of this finer or more highly organized and better-wearing metal. It is not new, however, to introduce into cams and gears of cast-iron or other cast metal steel teeth or wearing surfaces or portions; but such teeth or portions have been secured or attached to cast-iron hubs or webs either by means of bolts or by tongue and dovetail or other similar mechanical fastening, or by shrinking the steel ring on the iron hub or web. My invention varies, however, from this composite form of gear or cam in that the metal of the blank from which it is made, while of two or more kinds or qualities, is united by welding in the process of the manufacture of the metal from its cruder forms or from waste into a billet or large rod or other mass of suitable shape.

In practicing the invention the metals of which the gear or cam blanks are made are arranged in suitable or proper relation to each other in a box or envelope of suitable metal, preferably of iron. This box may be made of plates of iron or other suitable metal or may be formed by casting iron or other suitable metal to the desired shape, and in the box there is placed the metal which forms the hub or central part of the blank and the metal which is to form the teeth of the gear or the wearing portions of the cam, this metal preferably being of steel, tool-steel being used for this purpose, if desired. The metal for the central portion or hub of the gear or cam is made of mild steel or of iron. It is desirable, however, that this central metal shall be one that will melt or become workable at a temperature the same or a little less than that of the outer envelope of the mass when heated. In arranging the metals for the construction of gear-blanks the steel or wearing metal is placed close to the outer envelope. In making cam-blanks the steel or wearing metal is placed in relation to the outer envelope and the central mass according to the location which it is desired that it shall have in the finished blank. In arranging these metals the outer covering or shell will vary in thickness according to the use to which the blank to be made is to be put— that is, whether it be a gear or a cam blank; but whichever blank is to be made the covering must be of a metal which requires a higher melting-point than the steel of the wearing metal which it incloses, and also of a cheaper or milder steel or iron for the hub and other parts of the blank. The next step in the formation of the blanks is to heat the metals in a furnace, preferably by a slow heat, until they are in a proper condition for working into an ingot, and they are then united or welded to each other under heat and pressure by rolling or other usual means of manipulating ingots, and reduced to any desired form of section, preferably, however, to a circular form. This causes the metals to be thoroughly united with each other and to bear a proper relation to each other for subsequent production of gears or cams, and the rolled product, whether rod or billet, thus formed is then sawed, preferably while hot, into blanks of any desired thickness and suitable for reduction into gears or cams, as may be desired. The blanks may be provided with hubs when desired, either by forming in the blank billet or rod the sections reduced in diameter or by taking the blanks after they have been sawed and reheating them, if desired, and subjecting them to a drop-press, whereby the center of the blank is struck out from the remainder of the blank to form a hub or a hub-forming extension. The blank is then formed into a gear, for instance, by removing the comparatively soft iron or metal envelope about the steel to form teeth in the steel section of the blank. This may be done in an ordinary gear-cutting machine, and the teeth and sections of the cam are then hardened in the ordinary way of hardening steel. The cam-blanks have the iron removed to expose the steel in case the blank is intended for an edge cam, or the cam-track is formed in the steel in the ordinary way in case it is a groove-cam, and the steel is afterward hardened.

Figure 2:
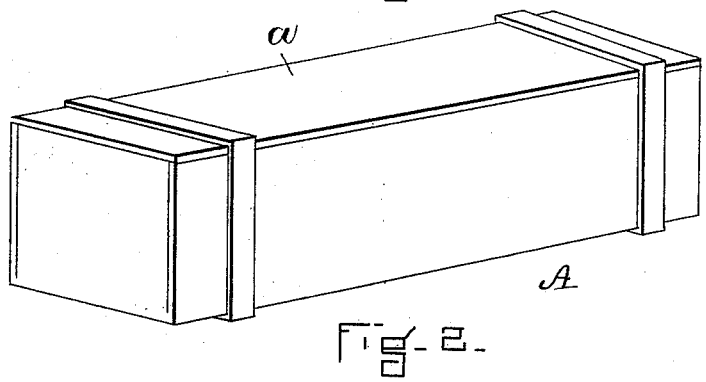
Figure 3:
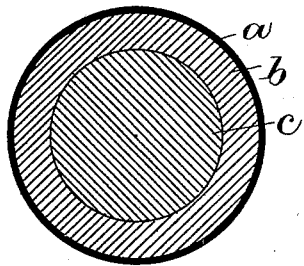
Figure 4:
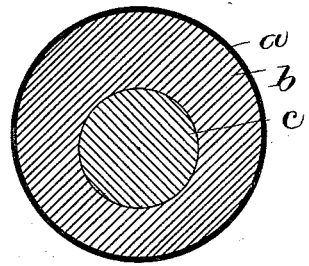
Figure 5:
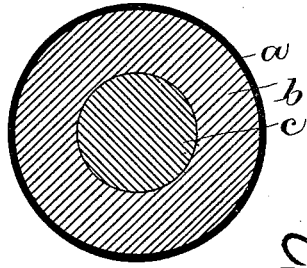
Figure 6:
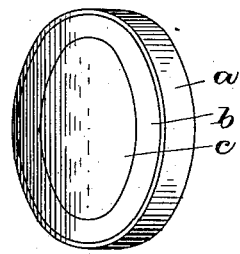
Figure 7:
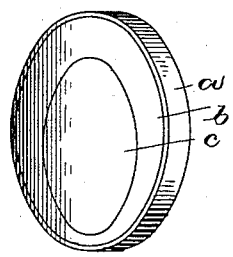
Figure 8:
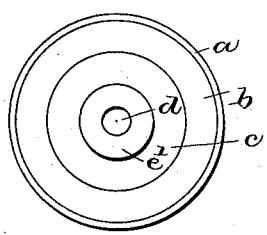
Figure 9:
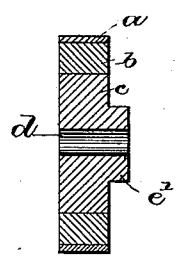
Figure 10:
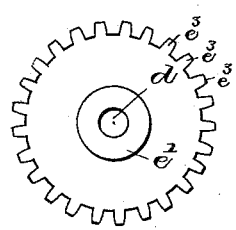
Figure 11:
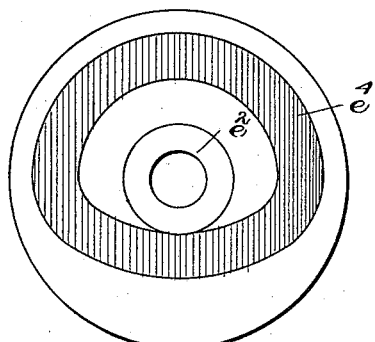
Figure 12:
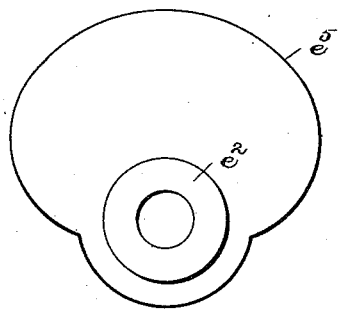
Figure 13:
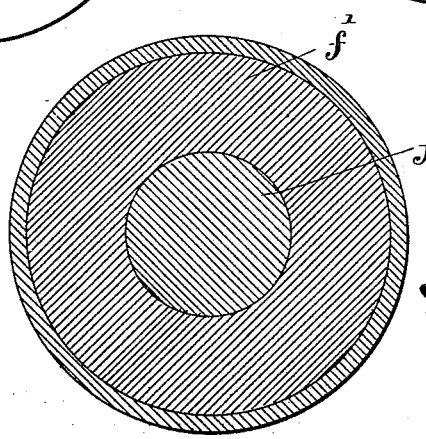

Referring to the drawings, Figure 1 is a view in cross-section of metal prepared for reduction. Fig. 2 is a view in perspective of a body of metal prepared for reduction. Fig. 3 is a view representing it reduced to a cylindrical form. Figs. 4 and 5 represent in sections different combinations of the various metals in cylindrical forms. Fig. 6 represents in perspective a gear-blank; Fig. 7, in perspective a cam-blank. Figs. 8, 9, and 10 illustrate the method of forming a gear from the gear-blank. Figs. 11 and 12 represent cams. Fig. 13 represents the metals assembled in cylindrical bodies.

A represents the metals as arranged preparatory to welding.

$a$ represents the envelope of iron or other suitable metal having a higher melting-point than the metals inclosed by it. It is desirable that this envelope shall entirely cover and protect the other metals inclosed by it.

$b$ represents the metal which is to form the wearing portions of the gear or cam and which is preferably of steel suitable for this purpose, and tool-steel may be used, if desired.

While I prefer steel as a metal having greater wearing properties and strength than iron, still I would not be understood as confining the invention to the employment of steel for the purpose of providing the wearing parts of the gear or cam, as any other metal having long life, strength, and wearing properties may be employed, and which will unite by welding in the manner herein specified with the protecting-envelope and a filling metal of less cost.

In Fig. 1 I have represented the steel as disposed in relation to the envelope to form a spur-gear blank.

$c$ represents the coarser less expensive metal for the filling. This may be mild steel or low iron or other suitable metal. It should, however, have a melting-point the same or less than that of the outer envelope and as near that of the steel as practicable; and in Fig. 2 I have represented the relation which the various metals bear to each other. The metals thus assembled together are heated by slow heat, as distinguished from rank heat, in a suitable furnace, in order that the interior metals may be heated to a proper consistency, and the heated mass is then reduced into an ingot and billet and into proper form for sawing into blanks by working and rolling; and in Fig. 3 I have represented a section of the rolled metal from which the gear-blanks are cut, $a$ being the iron envelope, $b$ the steel from which the teeth are made, and $c$ the coarser or cheaper filling metal; and in Fig. 4 I have represented a section of the rolled metal from which an edge cam is made, and in Fig. 5 a section of the rolled metal from which a groove-cam is made, in each instance $a$ representing the iron envelope, $b$ the steel, and $c$ the lower coarse metal.

In Fig. 6, $b$ represents in perspective a blank for a gear sawed from the rolled metal, and in Fig. 7 I have represented in perspective a blank for an edge cam cut from the rolled metal. This blank preferably is then heated and is subjected to the action of a drop-press, whereby its center $d$ is struck out and shaped by suitable dies to provide a collar or hub extending, preferably, from one side of the blank, (see Fig. 9,) where the gear-blank is represented with a hub $e'$ formed in this way, and Fig. 11, where the cam-blank is represented with a hub $e^2$ formed in this way. The gear-blank is then subjected to further treatment, whereby the iron envelope $a$ is removed and the teeth $e^3$ cut in the steel section, (see Fig. 10,) and the cam-blank is also subjected to a further forming operation, whereby either a groove $e^4$ is cut in the steel, as represented in Fig. 11, or the envelope of the steel cut away to form the edge cam $e^5$ of steel, (see Fig. 12,) and the steel then is subjected to any process by which it is hardened. This provides, in a comparatively inexpensive way, a gear having steel teeth or a cam having a steel edge or track, the steel section being integral with the remainder of the gear or cam, although the remaining metal of the gear or cam is lower-priced and of different quality, and all machine-work ordinarily necessary for fitting or securing steel teeth or wearing sections to the gears or cams is entirely dispened with.

In certain cases the metals used in the manufacture of the gears or cams may be assembled as represented in Fig. 13—that is, within the envelope, which preferably is made cylindrical, is placed, first, a circular piece $f$ of common iron or low steel, then a disk or other section $f'$ of the steel to form the working surface or part of the blank, in the center of which is placed the cheaper stock, iron or low steel, then a circular piece of low-priced stock, iron or low steel, then a disk of the more expensive stock, and so on. This construction may be employed when a high-priced metal like tool-steel is used in forming the blanks, and also when it is desired that the hub be formed not by striking up the center of the blank, but by turning a portion of the metal of the blank down to form the hub.

Having thus fully described my invention, I claim and desire to secure by Letters Patent of the United States—

1. The method of making a gear or cam blank having the metal for the teeth or wearing portions thereof of steel or other metal of similar wearing properties integral with the coarser or less expensive metal forming the remainder of the gear or cam blank, consisting in assembling in a metal envelope the steel or other wearing metal, and the other lower grade or lower-priced metal arranged in such relation to each other, as desired, then reducing the same to a homogeneous mass of a form for the production of the blanks under heat and pressure, and then sawing the formed mass into blanks, substantially as described.

2. As an improved article of manufacture, a gear or cam blank having a section of steel or other metal of similar wearing properties disposed to form the teeth of the gear or the wearing-surface of the cam, and an integral body or mass of lower grade or cheaper metal forming the body of the blank, substantially as described.

3. The method of making gears and cams, consisting in assembling in a metal envelope the metal forming the body of the gear or cam and the metal forming the wearing-surface thereof of a different character from that of the body metal; second, uniting the metal by heat and pressure and reducing them to a cylindrical or substantially cylindrical form; third, by rolling and sawing or cutting blanks of suitable width therefrom, and, fourth, treating said blanks to form teeth or wearing-surfaces in the metal thereof intended for such purpose, substantially as described.

4. The method of making gears and cams, consisting in assembling in a metal envelope the metal forming the body of the gear or cam and the metal forming the wearing-surface thereof of a different character from that of the body metal; second, uniting the metal by heat and pressure and reducing them to a cylindrical or substantially cylindrical form; third, sawing or cutting blanks of suitable width therefrom, and, fourth, treating said blanks to form teeth or wearing-surfaces in the metal thereof intended for such purpose, and then hardening the said wearing-sections, substantially as described.

5. As an improved article of manufacture, the cam or gear wheel having wearing-surfaces or teeth of steel integral with the body metal of the disk or wheel, and a hub formed by striking up or drop-forging the central section of the blank, substantially as described.

6. The method of making gears and cams, consisting in assembling metals of a high grade for the wearing surfaces or sections of the gear or blank and of low or cheap grade for the body thereof in a metal envelope, reducing the metals to an integral body or mass by heat and rolling, cutting or sawing from the mass a gear or cam blank, and forming a hub on said blank by striking its central portion laterally in suitable dies or by drop-forging, substantially as described.

7. A gear or cam blank having a hub formed by striking up or drop-forging while hot the central part of the blank, substantially as described.

FREEBORN F. RAYMOND, 2D.

In presence of—
  J. M. DOLAN,
  A. F. MACDONALD.